(12) United States Patent
Hirokami et al.

(10) Patent No.: US 12,180,369 B2
(45) Date of Patent: Dec. 31, 2024

(54) RUBBER COMPOSITION AND ORGANOSILICON COMPOUND

(71) Applicant: SHIN-ETSU CHEMICAL CO., LTD., Tokyo (JP)

(72) Inventors: Munenao Hirokami, Annaka (JP); Tsuneo Kimura, Annaka (JP); Masahiko Minemura, Annaka (JP); Tsutomu Nakamura, Tokyo (JP); Masaki Tanaka, Tokyo (JP); Satoru Uno, Tokyo (JP); Masashi Yano, Sayama (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 643 days.

(21) Appl. No.: 17/430,913

(22) PCT Filed: Jan. 23, 2020

(86) PCT No.: PCT/JP2020/002220
§ 371 (c)(1),
(2) Date: Aug. 13, 2021

(87) PCT Pub. No.: WO2020/166291
PCT Pub. Date: Aug. 20, 2020

(65) Prior Publication Data
US 2022/0169836 A1 Jun. 2, 2022

(30) Foreign Application Priority Data
Feb. 15, 2019 (JP) ................................. 2019-025620

(51) Int. Cl.
*C08L 9/06* (2006.01)
*B60C 1/00* (2006.01)
*B60C 11/00* (2006.01)

(52) U.S. Cl.
CPC ............. *C08L 9/06* (2013.01); *B60C 1/0016* (2013.01); *B60C 11/0008* (2013.01); *B60C 2011/0025* (2013.01); *C08L 2205/02* (2013.01)

(58) Field of Classification Search
CPC ...... C08L 9/06; C08L 2205/02; B60C 1/0016; B60C 11/0008; B60C 2011/0025
See application file for complete search history.

(56) References Cited

U.S. PATENT DOCUMENTS

| 6,017,985 | A | 1/2000 | Kang et al. |
| 6,229,036 | B1 | 5/2001 | Batz-Sohn et al. |
| 2003/0236424 | A1 | 12/2003 | Yanagisawa et al. |
| 2004/0132880 | A1 | 7/2004 | Durel et al. |
| 2019/0016876 | A1 | 1/2019 | Hirokami |

FOREIGN PATENT DOCUMENTS

| GB | 1 439 247 A | 6/1976 |
| JP | 51-20208 B2 | 6/1976 |
| JP | 2002-145890 A | 5/2002 |
| JP | 2004-18511 A | 1/2004 |
| JP | 2004-525230 A | 8/2004 |
| JP | 2010-168528 A | 8/2010 |
| JP | 2012-107077 A | 6/2012 |
| JP | 2012-107141 A | 6/2012 |
| JP | 2016-191040 A | 11/2016 |
| JP | 2017-160357 A | 9/2017 |
| WO | WO 2018/045291 A1 | 3/2018 |

OTHER PUBLICATIONS

International Search Report (PCT/ISA/210) issued in PCT/JP2020/002220 mailed on Mar. 24, 2020.
Written Opinion (PCT/ISA/237) issued in PCT/JP2020/002220 mailed on Mar. 24, 2020.
Extended European Search Report for European Application No. 20755903.0, dated Sep. 27, 2022.

*Primary Examiner* — Angela C Scott
(74) *Attorney, Agent, or Firm* — Birch, Stewart, Kolasch & Birch, LLP

(57) ABSTRACT

A rubber composition which contains (A) an organosilicon compound represented by formula (1) and gives a cured object satisfying desired fuel (or power)-saving tire properties.

$$H-[H_2C-HC=CH-CH_2]_e-[CH_2-CH]_f-[CH_2-CH]_g-H \quad (1)$$

(with pendant groups: $\underset{\|}{CH}{=}CH_2$ on the $f$ unit; and $CH_2-CH_2-Si(OR^1)_m R^2_{3-m}$ on the $g$ unit)

($R^1$ represents an alkyl or aryl group, $R^2$ represents an alkyl or aryl group, $e$, $f$, and $g$ each indicate a number larger than 0 and satisfy $g/(e+f+g)<0.05$, and $m$ is an integer of 1-3.)

9 Claims, No Drawings

RUBBER COMPOSITION AND ORGANOSILICON COMPOUND

TECHNICAL FIELD

This invention relates to a rubber composition, and more particularly, to a rubber composition comprising an organosilicon compound having a polybutadiene skeleton. It also relates to an organosilicon compound having a polybutadiene skeleton.

BACKGROUND ART

Silica-filled tires show excellent performance in the automotive application, especially excellent wear resistance, rolling resistance, and wet grip. Since these performance improvements are closely related to a saving of fuel (or power) consumption of tires, active efforts are currently devoted thereto.

The silica-filled rubber compositions are effective for reducing rolling resistance and improving wet grip of tires, but have drawbacks including a high unvulcanized viscosity, multi-stage milling, and inefficient working.

Therefore, rubber compositions simply loaded with inorganic fillers like silica suffer from problems like poor dispersion of the filler and substantial drops of rupture strength and wear resistance. Under the circumstances, sulfur-containing organosilicon compounds are essential for improving the dispersion of the inorganic filler in the rubber and for establishing chemical bonds between the filler and the rubber matrix (see Patent Document 1). The sulfur-containing organosilicon compounds are useful as the essential component for the manufacture of tires of silica-filled rubber compositions.

As the sulfur-containing organosilicon compound, compounds containing an alkoxysilyl group and polysulfidesilyl group in the molecule, for example, bis-triethoxysilylpropyltetrasulfide and bis-triethoxysilylpropyldisulfide are known effective (see Patent Documents 2 to 5).

On the other hand, Patent Document 6 shows an attempt to blend a same-modified butadiene polymer in silica-filled rubber compositions. Patent Document 6 proposes a liquid silane-modified butadiene polymer and describes that the polymer preferably contains at least 5% of units having a hydrolyzable silyl group. Nevertheless, further improvements in silica dispersion and tire physical properties including wear resistance, rolling resistance, and wet grip are desired.

PRIOR ART DOCUMENTS

Patent Documents

Patent Document 1: JP-B S51-20208
Patent Document 2: JP-A 2004-525230
Patent Document 3: JP-A 2004-018511
Patent Document 4: JP-A 2002-145890
Patent Document 5: U.S. Pat. No. 6,229,036
Patent Document 6: JP-A 2016-191040

SUMMARY OF INVENTION

Technical Problem

An object of the invention, which has been made under the above-mentioned circumstances, is to provide an organosilicon compound for use in a rubber composition and a rubber composition comprising the organosilicon compound, the rubber composition forming a crosslinked cured product which is improved in silica dispersion, wear resistance, rolling resistance, and wet grip so that desired low fuel (or power) consumption tires may be manufactured.

Solution to Problem

Making extensive investigations to attain the above object, the inventors have found that a specific organosilicon compound having a hydrolyzable silyl group and a butadiene skeleton, when added to a rubber composition, is effective for improving the silica dispersion, wear resistance, rolling resistance, and wet grip of the cured composition, and that tires having desired low fuel (or power) consumption properties can be manufactured from the rubber composition. The invention is predicated on this finding.

Accordingly, the invention provides the following.

1. A rubber composition comprising (A) an organosilicon compound having the formula (1):

[Chem. 1]

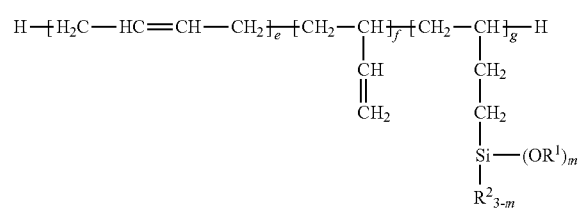

wherein $R^1$ is each independently a $C_1$-$C_{10}$ alkyl group or $C_6$-$C_{10}$ to aryl group, $R^2$ is each independently a $C_1$-$C_{10}$ alkyl group or $C_6$-$C_{10}$ aryl group, e, f, and g are each independently a number of more than 0, $g/(e+f+g)$ is a number of less than 0.05, and m is an integer of 1 to 3, with the proviso that the arrangement of individual repeat units is arbitrary.

2. The rubber composition of 1 wherein the organosilicon compound (A) has a number average molecular weight of up to 100,000.

3. The rubber composition of 1 or 2 wherein in the organosilicon compound, $(f+g)/(e+f+g)$ is a number of up to 0.6.

4. The rubber composition of any one of 1 to 3, further comprising (B) a diene rubber and (C) a filler.

5. The rubber composition of 4 wherein the filler (C) is silica.

6. A tire obtained by molding the rubber composition of any one of 1 to 5.

7. An organosilicon compound having the formula (1):

[Chem. 2]

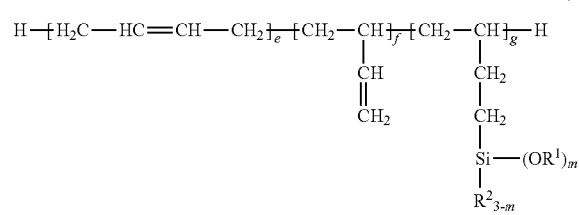

wherein $R^1$ is each independently a $C_1$-$C_{10}$ to alkyl group or $C_6$-$C_{10}$ aryl group, $R^2$ is each independently a $C_1$-$C_{10}$ alkyl group or $C_6$-$C_{10}$ aryl group, e, f, and g are each independently a number of more than 0, g/(e+f+g) is a number of less than 0.05, (f+g)/(e+f+g) is a number of up to 0.6, and in is an integer of 1 to 3, with the proviso that the arrangement of individual repeat units is arbitrary.

Advantageous Effects of Invention

Since the rubber composition of the invention contains the organosilicon compound having a hydrolyzable silyl group and a butadiene skeleton, tires manufactured from the composition meet the desired low fuel (or power) consumption tire properties.

DESCRIPTION OF EMBODIMENTS

Now the invention is described in detail.
[(A) Organosilicon Compound]
The rubber composition of the invention contains (A) an organosilicon compound having the formula (1). It is noted that in formula (1), the arrangement of individual repeat units is arbitrary.

[Chem. 3]

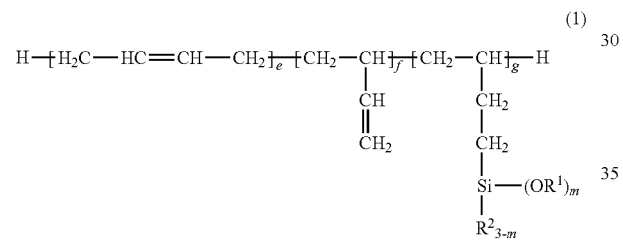

(1)

In formula (1), $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, e, f, and g are each independently a number of more than 0, g/(e+f+g) is a number of less than 0.05, and in is an integer of 1 to 3, with the proviso that the arrangement of individual repeat units is arbitrary.

The $C_1$-$C_{10}$ alkyl groups represented by $R^1$ and $R^2$ may be straight, branched or cyclic and examples thereof include methyl, ethyl, n-propyl, i-propyl, n-butyl, s-butyl, t-butyl, n-pentyl, n-hexyl, n-heptyl, n-octyl, n-nonyl, n-decyl, cyclopropyl, cyclobutyl, cyclopentyl, cyclohexyl, cyclohept, and cyclooctyl.

Suitable $C_6$-$C_{10}$ aryl groups include phenyl, α-naphthyl, and β-naphthyl.

Among others, $R^1$ is preferably a straight alkyl group, more preferably methyl or ethyl.

Also $R^2$ is preferably a straight alkyl group, more preferably methyl or ethyl.

The subscript e is preferably a number of 1 to 500, more preferably 5 to 300.

The subscript f is preferably a number of 1 to 500, more preferably 5 to 300.

The subscript g is preferably a number of 0.1 to 500, more preferably 0.1 to 10, even more preferably 0.5 to 5.

The value of g/(e±f+g) is a number of less than 0.05, preferably less than 0.045, more preferably up to 0.04, and even more preferably up to 0.03. If the value is equal to or more than 0.05, the crosslinked cured product is aggravated in silica dispersion.

The value of (f+a)/(e+f+g) is preferably a number of up to 0.6, more preferably up to 0.4. A number of more than 0.6 may invite a high viscosity and difficulty to handle. Using an organosilicon compound wherein (f+g)/(e+f+g) is up to 0.6 is effective for improving the properties of a rubber composition.

The organosilicon compound of formula (1) preferably has a number average molecular weight of up to 100,000 and more preferably in the range of 800 to 50,000. A molecular weight in excess of 100,000 may invite a high viscosity and difficulty to to handle. As used herein, the number average molecular weight is measured by gel permeation chromatography (GPC) versus polystyrene standards.

The organosilicon compound (A) having formula (1) may be obtained, according to the scheme shown below, from hydrosilylation reaction of a polybutadiene having the formula (2) with an organosilicon compound having the formula (3) in the presence of a platinum-containing catalyst. In some cases, a co-catalyst may be used for the reaction to proceed more efficiently.

[Chem. 4]

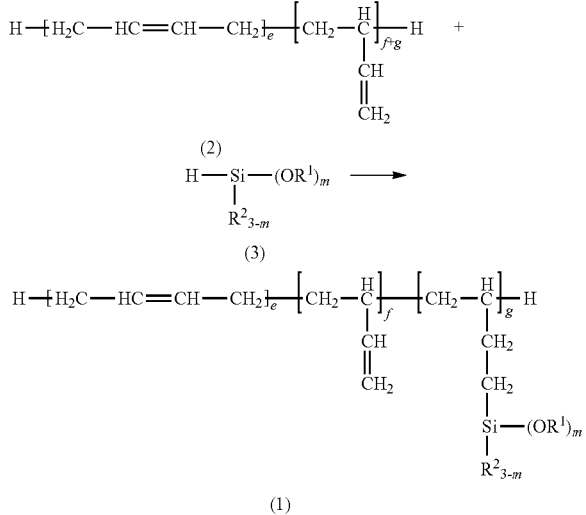

(1)

Herein, $R^1$, $R^2$, e, f, g, and m are as defined above.

The polybutadiene having formula (2) is commercially available. Marketed examples include Ricon 130, Ricon 131, Ricon 134, Ricon 142, Ricon. 150, Ricon 152, Ricon 153, Ricon 154, Ricon 156, and Ricon 157 (from Cray Valley), LBR-302, LBR-307, LBR-305, LBR-300, LBR-352 and LBR-361 (from Kurarav Co., Ltd.), and B-1000, B-2000, and B-3000 (from Nippon Soda Co., Ltd.).

Examples of the organosilicon compound having formula (3) include trimethoxysilane, methyldimethoxysilane, dimethylmethoxysilane, triethoxysilane, methyldiethoxysilane, and dimethylethoxysilme.

In the reaction of a copolymer having formula (2) with a compound having to formula (3), the amount of the compound having formula (3) is preferably up to 5 moles, more preferably up to 3 moles per mole of the copolymer having formula. (2). The amount of the compound is preferably at least 0.5 mole though the lower limit is not critical.

The platinum-containing catalyst used in hydrosilylation reaction is not particularly limited. Suitable catalysts include chloroplatinic acid, alcohol solutions of chloroplatinic acid, toluene and xylene solutions of platinum-1,3-divinyl-1,1,3,3-tetramethyldisiloxane complex, tetrakistriphenylphosphine platinum, dichlorobistriphenylphosphine platinum, dichlorobisacetonitrile platinum, dichlorobisbenzonitrile platinum, and dichlorocyclooctadiene, platinum, as well as supported catalysts such as platinum-on-carbon, platinum-on-alumina and platinum-on-silica.

In view of selectivity upon hydrosilylation, zero-valent platinum complexes are preferred, with toluene and xylene solutions of platinum-1,3-divinyl-1,1,3,3-tetramethyldisiloxane complex being more preferred.

The amount of the platinum-containing catalyst used is not particularly limited. In view of reactivity and productivity, the catalyst is preferably used in an amount to provide $1 \times 10^{-7}$ to $1 \times 10^{-2}$ mole, more preferably $1 \times 10^{-7}$ to $1 \times 10^{-3}$ mole of platinum atom per mole of the organosilicon compound having formula (3).

The co-catalyst used in the reaction is preferably at least one member selected from ammonium salts of inorganic acids, acid amide compounds, and carboxylic acids.

Suitable ammonium salts of inorganic acids include ammonium chloride, ammonium sulfate, ammonium amidosulfate, ammonium nitrate, monoammonium dihydrogenphosphate, diammonium hydrogenphosphate, triammonium phosphate, ammonium hypophosphite, ammonium carbonate, ammonium hydrogencarbonate, ammonium sulfide, ammonium borate, and ammonium borofluoride. Inter alia, ammonium salts of inorganic acids having pKa of at least 2 are preferred, with ammonium carbonate and ammonium hydrogencarbonate being more preferred.

Suitable acid amide compounds include formamide, acetamide, N-methylacetamide, N,N-dimethylacetamide, propionamide, acrylamide, malonamide, succinamide, maleamide, fumaramide, benzamide, phthalamide, palmitamide, and stearamide.

Suitable carboxylic acids include acetic acid, propionic acid, butyric acid, methoxyacetic acid, pentanoic acid, caproic acid, heptanoic acid, octanoic acid, lactic acid, and glycolic acid. Inter alia, formic acid, acetic acid and lactic acid are preferred, with acetic acid being more preferred.

The amount of the co-catalyst used is not particularly limited. In view of reactivity, selectivity and cost, the co-catalyst is preferably used in an amount of $1 \times 10^{-5}$ to $1 \times 10^{-1}$ mole, more preferably $1 \times 10^{-4}$ to $5 \times 10^{-1}$ mole per mole of the organosilicon compound having formula (3).

A solvent may be used although the reaction takes place in a solventless system.

Suitable solvents include hydrocarbon solvents such as pentane, hexane, cyclohexane, heptane, isooctane, benzene, toluene, and xylene, ether solvents such as diethyl ether, tetrahydrofuran, and dioxane, ester solvents such as ethyl acetate and butyl acetate, aprotic polar solvents such as N,N-dimethylformamide, and chlorinated hydrocarbon solvents such as dichloromethane and chloroform, which may be used alone or in admixture.

Although the temperature for hydrosilylation reaction is not particularly limited, it is preferably from 0° C. to an elevated temperature, more preferably 0° C. to 200° C.

An elevated temperature is preferred for gaining an appropriate reaction rate. In this sense, the reaction temperature is preferably 40 to 110° C., more preferably 40 to 90° C.

Although the reaction time is not particularly limited, it is typically 1 to about 60 hours, preferably 1 to 30 hours, and more preferably 1 to 20 hours.

[Rubber Composition]

The rubber composition of the invention is defined as comprising (A) the organosilicon compound having formula (1), (B) a diene rubber, and (C) a filler.

(A) Organosilicon Compound

In view of rubber physical properties, the extent of available effects, and a balance to thereof with economy, the amount of the organosilicon compound (A) having formula (1) blended is preferably 0.1 to 20 parts by weight, more preferably 1 to 10 parts by weight per 100 parts by weight of the filler (C) to be described later.

(B) Diene Rubber

As the diene rubber (B), any of rubbers which are commonly used in various rubber compositions may be used. Suitable rubbers include natural rubber (NR), and diene rubbers such as isoprene rubber (IR), styrene-butadiene copolymer rubbers (SBR), polybutadiene rubbers (BR), and acrylonitrile-butadiene copolymer rubbers (NBR), which may be used alone or in admixture. Along with the diene rubber, non-diene rubbers such as butyl rubber (IIR) and ethylene-propylene copolymer rubbers (EPR, EPDM) may be used.

(C) Filler

Examples of the filler (C) include silica, talc, clay, aluminum hydroxide, magnesium hydroxide, calcium carbonate, and titanium oxide. Of these, silica is preferred. More preferably, the rubber composition of the invention is used as a silica-filled rubber composition.

In view of rubber physical properties, the extent of available effects, and a balance thereof with economy, the amount of the filler (C) blended is preferably 5 to 200 parts by weight, more preferably 30 to 120 parts by weight per 100 parts by weight of the diene rubber.

Other Components

Besides the foregoing components, various additives commonly used in tire and general rubber compositions such as silane coupling agents, carbon black, vulcanizing agents, crosslinking agents, vulcanization accelerators, crosslinking accelerators, oils, antioxidants, and plasticizers may also be compounded in the rubber composition. The amounts of the additives may be ordinary as long as the objects of the invention are not impaired.

Of the silane coupling agents, sulfur-containing organosilicon compounds as to component (D) are preferred. Suitable sulfur-containing organosilicon compounds include polysulfide group-containing organosilicon compounds, mercapto group-containing organosilicon compounds, thioester group-containing organosilicon compounds, and thioether group-containing organosilicon compounds. The polysulfide group-containing organosilicon compounds are not particularly limited, and examples thereof include its bis(trimethoxysilylpropyptetrasulfide, bis(triethoxysilylpropyl) tetrasulfide, bis(trimethoxysilylpropyl)disulfide, and bis(triethoxysilylpropyl)disulfide. Preferably, the rubber composition of the invention contains the sulfur-containing organosilicon compound (D). In view of rubber physical properties, the extent of available effects, and a balance thereof with economy, the amount of the sulfur-containing organosilicon compound (D) blended is preferably 0.1 to 30 parts by weight, more preferably 5 to 15 parts by weight per 100 parts by weight of the filler (C).

[Method of Preparing Composition]

The rubber composition of the invention is prepared in the standard way by adding the organosilicon compound (A), silica (C), and additives to the diene rubber (B) and kneading them.

[Rubber Article or Tire]

By kneading the components in the standard way, there is obtained the inventive rubber composition, which is ready for use in the manufacture of rubber articles, typically tires, via vulcanization or crosslinking. Especially in manufacturing tires, the rubber composition is preferably used as treads.

Since the tires obtained from the rubber composition are significantly reduced in rolling resistance and significantly improved in wear resistance, the desired saving of fuel (or power) consumption is achievable.

The tire may have any prior art well-known structures and be manufactured by any prior art well-known techniques. In the case of pneumatic tires, the gas introduced therein may be ordinary air, air having a controlled oxygen partial pressure, or an inert gas such as nitrogen, argon or helium.

EXAMPLES

Examples and Comparative Examples are given below for further illustrating the invention although the invention is not limited thereto.

All parts are by weight (pbw). The molecular weight is a number average molecular weight (Mn) as measured versus polystyrene standards by gel permeation chromatography (GPC). The viscosity is measured at 25° C. by a rotational viscometer.

Preparation of Organosilane Compounds

Examples 1-1 to 1-4 and Comparative Examples 1-1 to 1-3

Example 1-1

A 2-L separable flask equipped with a stirrer, reflux condenser, dropping funnel and thermometer was charged with 1,000 g of Ricon 130 (having formula (2) wherein (f+g)/(e+f+g)=0.28, Mn=2,500, by Cray Valley), 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 135 g (0.80 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 2,500 mPa·s and a Mn of 2,800.

From the Mn and $^1$H-NMR spectrum, the product was an organosilicon compound of the average structure having formula (1) wherein e=33, f=11, and g=2. Also, g/(e+f+g)=0.04 and (f+g)/(e+f+g)=0.28.

Example 1-2

A 2-L separable flask equipped with a stirrer, reflux condenser, dropping funnel and thermometer was charged with 1,000 g of Ricon 130, 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52/10^{-2}$ mol) of acetic acid. At an internal temperature of 75-85° C., 68 g (0.40 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 2,700 mPa·s and a Mn of 2,700.

From the Mn and $^1$H-NMR spectrum, the product was an organosilicon compound of the average structure having formula (1) wherein e=33, f=12, and g=1. Also, g/(e+f+g)=0.02 and (f+g)/(e+f+g)=0.28.

Example 1-3

A 2-L separable flask equipped with a stirrer, reflux condenser, dropping funnel and thermometer was charged with 1,000 g of Ricon 131 (having formula (2) wherein (f+g)/(e+f+g)=0.28, Mn=4,500, by Cray Valley), 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 75 g (0.44 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 8,500 mPa·s and a Mn of 4,800.

From the Mn and $^1$H-NMR spectrum, the product was an organosilicon compound of the average structure having formula (1) wherein e=60, f=21, and g=2. Also, g/(e+f+g)=0.02 and (f+g)/(e+f+g)=0.28.

Example 1-4

A 2-L separable flask equipped with a stirrer, reflux condenser, dropping funnel and thermometer was charged with 1,000 g of Ricon 131, 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 38 g (0.22 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 8,800 mPa·s and a Mn of 4,700.

From the Mn and $^1$H-NMR spectrum, the product was an organosilicon compound of the average structure having formula (1) wherein e=60, f=22, and g=1. Also, g/(e+f+g)=0.01 and (f+g)/(e+f+g)=0.28.

Comparative Example 1-1

A 2-L separable flask equipped with a stirrer, reflux condenser, dropping funnel and thermometer was charged with 1,000 g of B-1000 (having formula (2) wherein (f+g)/

(e+f+g)=0.9, Mn=1,100, by Nippon Soda Co., Ltd.), 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 125 g (0.64 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 9,600 mPa·s and a Mn of 1,200.

From the Mn and $^1$H-NMR spectrum, the product was an organosilicon compound of the average structure having formula (1) wherein e=2, f=17.2, and g=0.8. Also, g/(e+f+g)=0.04 and (f+g)/(e+f+g)=0.9.

Comparative Example 1-2

A 2-L separable flask equipped with a stirrer, reflux condenser, dropping funnel and thermometer was charged with 1,000 g of Ricon 130, 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 203 g (1.20 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 2,600 mPa·s and a Mn of 3,000.

From the Mn and $^1$H-NMR spectrum, the product was an organosilicon compound of the average structure having formula (1) wherein e=33, f=10, and g=3. Also, g/(e+f+g)=0.06 and (f+g)/(e+f+g)=0.28.

Comparative Example 1-3

A 2-L separable flask equipped with a stirrer, reflux condenser, dropping funnel and thermometer was charged with 1,000 g of B-1000, 200 g of toluene, an amount ($0.52 \times 10^{-4}$ mol of platinum atom) of toluene solution of platinum-1,3-divinyl-1,1,3,3-tetramethyldisiloxane complex, and 0.31 g ($0.52 \times 10^{-2}$ mol) of acetic acid. At an internal temperature of 75-85° C., 270 g (1.6 mol) of triethoxysilane was added dropwise over 2 hours to the mixture, which was stirred at 80° C. for a further 1 hour.

At the end of stirring, the reaction mixture was concentrated under reduced pressure and filtered, obtaining a brown transparent liquid having a viscosity of 9,100 mPa·s and a Mn of 1,400. From the Mn and $^1$H-NMR spectrum, the product was an organosilicon compound of the average structure having formula (1) wherein e=2, f=16, and g=2. Also, g/(e+f+g)=0.10 and (f+g)/(e+f+g)=0.9.

[2] Preparation of Rubber Compositions

Examples 2-1 to 2-6 and Comparative Examples 2-1 to 2-3

On a 4-L internal mixer (MIXTRON by Kobelco), SBR and BR shown in Tables 1 and 2 were kneaded for 30 seconds.

Next, oil component, carbon black, silica, sulfide silane, the organosilicon compounds of Examples 1-1 to 1-4 and Comparative Examples 1-1 to 1-3, stearic acid, antioxidant, and wax were added to the mix. The internal temperature was raised to 150° C., after which the mix was held at 150° C. for 2 minutes and discharged. This was followed to by stretching on a roll mill. The resulting rubber was kneaded again on the internal mixer (MIXTRON by Kobelco) until the internal temperature reached 140° C., discharged, and stretched on a roll mill.

Rubber compositions were obtained by adding zinc oxide, vulcanization accelerator and sulfur shown in Tables 1 and 2 to the rubber and kneading them. The rubber compositions were press molded at 150° C. for 15 to 40 minutes into vulcanized rubber sheets (2 mm thick).

The rubber compositions of Examples 2-1 to 2-6 and Comparative Examples 2-1 to 2-3 were measured for physical properties in unvulcanized and vulcanized states by the following tests. The results are also shown in Tables 1 and 2.

[Unvulcanized Physical Properties]
(1) Mooney Viscosity

According to HS K6300, measurement was made under conditions: temperature 100° C., preheating 1 minute, and measurement 4 minutes. The measurement result was expressed as an index based on 100 for Comparative Example 2-1. A lower index corresponds to a lower Mooney viscosity and indicates better workability.

[Vulcanized Physical Properties]
(2) Dynamic Viscoelasticity (Strain Dispersion)

Using a viscoelasticity meter (Metravib), a storage elasticity at strain 0.5%, E' (0.5%) and a storage elasticity at strain 3.0%, E' (3.0%) were measured under conditions: temperature 25° C. and frequency 55 Hz. A value of [E' (0.5%)–E' (3.0%)] was computed. The test specimen was a sheet of 0.2 cm thick and 0.5 cm wide, the clamp span was 2 cm, and the initial load was 1 N.

The value of [E' (0.5%)–E' (3.0%)] was expressed as an index based on 100 for to Comparative Example 2-1. A lower index indicates better dispersion of silica.

(3) Dynamic Viscoelasticity (Temperature Dispersion)

Using a viscoelasticity meter (Metravib), measurement was made under conditions: tensile dynamic strain 1% and frequency 55 Hz. The test specimen was a sheet of 0.2 cm thick and 0.5 cm wide, the clamp span was 2 cm, and the initial load was 1 N.

The values of tan δ (0° C.) and tan δ (60° C.) were expressed as an index based on 100 for Comparative Example 2-1. A greater index of tan δ (0° C.) indicates a better wet grip. A lower index of tan δ (60° C.) indicates better rolling resistance.

(4) Wear Resistance

Using a FPS tester (Ueshima Seisakusho Co., Ltd.), the test was carried out under conditions: sample speed 200 m/min, load 20 N, road temperature 30° C., and slip rate 5%.

The measurement result was expressed as an index based on 100 for Comparative Example 2-1. A greater index indicates a smaller abrasion and hence, better wear resistance.

TABLE 1

| Formulation (pbw) | | Example 2-1 | Example 2-2 | Example 2-3 | Example 2-4 | Example 2-5 | Example 2-6 |
|---|---|---|---|---|---|---|---|
| (B) SBR | | 80 | 80 | 80 | 80 | 80 | 80 |
| (B) BR | | 20 | 20 | 20 | 20 | 20 | 20 |
| Oil | | 30 | 30 | 30 | 30 | 30 | 30 |
| Carbon black | | 5 | 5 | 5 | 5 | 5 | 5 |
| (C) Silica | | 75 | 75 | 75 | 75 | 75 | 75 |
| (D) Sulfide silane | | 6 | 6 | 6 | 6 | 6 | 6 |
| (A) Organosilicon compound | Example 1-1 | 4 | 2 | — | — | — | — |
| | Example 1-2 | — | — | 2 | — | — | — |
| | Example 1-3 | — | — | — | 2 | — | — |
| | Example 1-4 | — | — | — | — | 2 | — |
| | Comparative Example 1-1 | — | — | — | — | — | 2 |
| Stearic acid | | 2 | 2 | 2 | 2 | 2 | 2 |
| Antioxidant | | 2 | 2 | 2 | 2 | 2 | 2 |
| Wax | | 1 | 1 | 1 | 1 | 1 | 1 |
| Zinc oxide | | 2.5 | 2.5 | 2.5 | 2.5 | 2.5 | 2.5 |
| Vulcanization accelerator (a) | | 1 | 1 | 1 | 1 | 1 | 1 |
| Vulcanization accelerator (b) | | 0.3 | 0.3 | 0.3 | 0.3 | 0.3 | 0.3 |
| Vulcanization accelerator (c) | | 1.5 | 1.5 | 1.5 | 1.5 | 1.5 | 1.5 |
| Sulfur | | 2 | 2 | 2 | 2 | 2 | 2 |
| [Unvulanized physical properties] | | | | | | | |
| Mooney viscosity | | 85 | 90 | 92 | 92 | 94 | 96 |
| [Vulcanized physical properties] | | | | | | | |
| Strain dispersion [E' (0.5%) − E' (3.0%)] | | 90 | 90 | 85 | 85 | 86 | 94 |
| Dynamic viscoelasticity tanδ (0° C.) | | 110 | 110 | 111 | 111 | 110 | 103 |
| Dynamic viscoelasticity tanδ (60° C.) | | 90 | 91 | 84 | 87 | 84 | 95 |
| Wear resistance | | 109 | 108 | 115 | 112 | 115 | 105 |

TABLE 2

| | Formulation (pbw) | Comparative Example 2-1 | Comparative Example 2-2 | Comparative Example 2-3 |
|---|---|---|---|---|
| | (B) SBR | 80 | 80 | 80 |
| | (B) BR | 20 | 20 | 20 |
| | Oil | 30 | 30 | 30 |
| | Carbon black | 5 | 5 | 5 |
| | (C) Silica | 75 | 75 | 75 |
| | (D) Sulfide silane | 6 | 6 | 6 |
| (A) Organosilcon compound | Comparative Example 1-2 | — | 2 | — |
| | Comparative Example 1-3 | — | — | 2 |
| | Stearic acid | 2 | 2 | 2 |
| | Antioxidant | 2 | 2 | 1 |
| | Wax | 1 | 1 | 1 |
| | Zinc oxide | 2.5 | 2.5 | 2.5 |
| | Vulcanization accelerator (a) | 1 | 1 | 1 |
| | Vulcanization accelerator (b) | 0.3 | 0.3 | 0.3 |
| | Vulcanization accelerator (c) | 1.5 | 1.5 | 1.5 |
| | Sulfur | 2 | 2 | 2 |
| [Unvulcanized physical properties] | | | | |
| | Money viscosity | 100 | 90 | 96 |
| [Vulcanized physical properties] | | | | |
| | Strain dispersion[E' (0.5%) − E' (3.0%)] | 100 | 105 | 105 |
| | Dynamic viscoelasticity tanδ (0° C.) | 100 | 101 | 100 |
| | Dynamic viscoelasticity tanδ (60° C.) | 100 | 98 | 98 |
| | Wear resistance | 100 | 100 | 100 |

| | |
|---|---|
| SBR: | SLR-4602 (Trinseo S.A.) |
| BR: | BR-01 (JSR Corp.) |
| Oil: | AC-12 (Idemitsu Kosan Co., Ltd.) |
| Carbon black: | Seast 3 (Tokai Carbon Co., Ltd.) |
| Silica: | Nipsil AQ (Tosoh Silica Co., Ltd.) |
| Sulfide silane: | KBE-846 (Shin-Etsu Chemical Co., Ltd.) |
| Stearic acid: | industrial stearic acid (Kao Corp.) |
| Antioxidant: | Nocrac 6C (Ouchi Shinko Chemical Industry Co., Ltd.) |
| Wax: | Ozoace 0355 (Nippon Seiro Co., Ltd.) |
| Zinc oxide: | Zinc white #3 (Mitsui Mining & Smelting Co., Ltd.) |
| Vulcanization accelerator (a): | Nocceler D (Ouchi Shinko Chemical Industry Co., Ltd.) |

TABLE 2-continued

| Formulation (pbw) | | Comparative Example 2-1 | Comparative Example 2-2 | Comparative Example 2-3 |
|---|---|---|---|---|
| Vulcanization accelerator (b): | Nocceler DM-P (Ouchi Shinko Chemical Industry Co., Ltd.) | | | |
| Vulcanization accelerator (c): | Nocceler CZ-G (Ouchi Shinko Chemical Industry Co., Ltd.) | | | |
| Sulfur: | 5% oil-treated sulfur (Hosoi Chemical Industry Co., Ltd.) | | | |

As shown in Tables 1 and 2, the vulcanized rubber compositions of Examples 2-1 to 2-6 have lower values of strain dispersion [E' (0.5%)–E' (3.0%)] than the vulcanized rubber compositions of Comparative Examples 2-1 to 2-3, indicating better dispersion of silica; higher values of dynamic viscoelasticity tan δ (0° C.), indicating better wet grip; lower values of dynamic viscoelasticity tan δ (60° C.), indicating a smaller hysteresis loss, less heat generation, and better wear resistance.

The invention claimed is:

1. A rubber composition comprising (A) an organosilicon compound, (B) a diene rubber, (C) a filler, and (D) a sulfur-containing organosilicon compound; (A) the organosilicon compound having the formula (1):

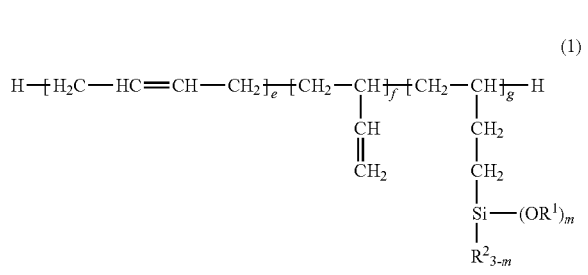

(1)

wherein $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, e, f, and g e and f are each independently a number of 1 to 500, g is a number of 0.1 to 10, g/(e+f+g) is a number of 0.01 or more and less than 0.05, (f+g)/(e+f+g) is a number of 0.28 or more and up to 0.6, and m is an integer of 1 to 3, with the proviso that the arrangement of individual repeat units is arbitrary.

2. The rubber composition of claim 1 wherein the organosilicon compound (A) has a number average molecular weight of up to 100,000.

3. The rubber composition of claim 1 wherein the filler (C) is silica.

4. The rubber composition of claim 1 wherein the organosilicon compound (A) has a number average molecular weight of 800 to 4,800.

5. The rubber composition of claim 1 wherein the organosilicon compound (A) is in a liquid form.

6. A tire obtained by molding the rubber composition of claim 1.

7. An organosilicon compound having the formula (1):

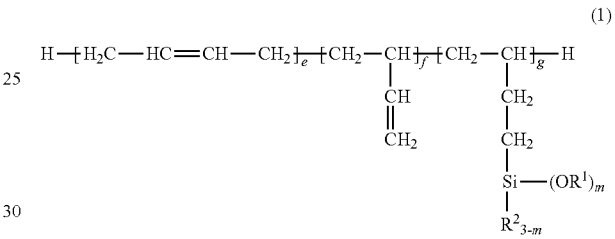

(1)

wherein $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, e and f are each independently a number of 1 to 500, g is a number of 0.1 to 10, g/(e+f+g) is a number of 0.01 or more and less than 0.05, (f+g)/(e+f+g) is a number of 0.28 or more and up to 0.6, and m is an integer of 1 to 3, with the proviso that the arrangement of individual repeat units is arbitrary.

8. The organosilicon compound of claim 7 which has a number average molecular weight of 800 to 4,800.

9. The organosilicon compound of claim 7 which is in a liquid form.

* * * * *